United States Patent
Heesch

(10) Patent No.: US 10,362,774 B2
(45) Date of Patent: Jul. 30, 2019

(54) FISHING LEADER WITH MULTI-LAYERED CRIMP SLEEVE

(71) Applicant: Christian Martin Heesch, Spanish Fort, AL (US)

(72) Inventor: Christian Martin Heesch, Spanish Fort, AL (US)

( * ) Notice: Subject to any disclaimer, the term of this patent is extended or adjusted under 35 U.S.C. 154(b) by 279 days.

(21) Appl. No.: 15/731,282

(22) Filed: May 18, 2017

(65) Prior Publication Data

US 2018/0332838 A1    Nov. 22, 2018

(51) Int. Cl.
*A01K 91/14*    (2006.01)
*A01K 91/047*    (2006.01)

(52) U.S. Cl.
CPC ............ *A01K 91/14* (2013.01); *A01K 91/047* (2013.01)

(58) Field of Classification Search
CPC .............................. A01K 91/14; A01K 91/047
USPC ......................................................... 43/44.98
See application file for complete search history.

(56) References Cited

U.S. PATENT DOCUMENTS

| | | | | |
|---|---|---|---|---|
| 2,392,147 A * | 1/1946 | Hickson | ............... | A01K 91/04 43/42.74 |
| 2,488,414 A * | 11/1949 | Forrest | ............... | A01K 91/047 28/141 |
| 2,674,824 A * | 4/1954 | Werner | ............... | A01K 91/14 24/129 D |
| 2,700,843 A * | 2/1955 | Werner | ............... | A01K 91/14 43/44.82 |
| 3,385,619 A * | 5/1968 | Thomas | ............... | A01K 91/047 289/1.2 |
| 3,512,223 A * | 5/1970 | Willinger | ............... | B29C 65/70 114/230.26 |
| 3,858,848 A * | 1/1975 | MacFetrich | ............ | H02G 1/081 15/104.33 |
| 5,690,444 A * | 11/1997 | Yuuki | ............... | A44B 19/262 24/429 |
| 6,862,838 B1 * | 3/2005 | Gibbs | ............... | A01K 91/14 43/42.74 |
| 6,880,289 B1 * | 4/2005 | Yin | ............... | A01K 91/047 403/353 |
| 9,883,663 B1 * | 2/2018 | Hammon | ............... | A01K 91/04 |
| 2003/0000621 A1 * | 1/2003 | Bittar | ............... | A01K 91/03 156/73.2 |
| 2005/0039376 A1 * | 2/2005 | Blette | ............... | A01K 91/047 43/43.1 |
| 2006/0130389 A1 * | 6/2006 | Annelin | ............... | A01K 91/047 43/44.98 |

(Continued)

FOREIGN PATENT DOCUMENTS

GB       2449297 A  *  11/2008  ........... A01K 91/047
WO   WO-9818316 A1 *   5/1998  ........... A01K 91/047

*Primary Examiner* — Christopher P Ellis

(57) ABSTRACT

A crimp sleeve for joining a loop of a fishing leader is disclosed. The crimp sleeve consists of an outer compressible and permanently deformable layer which is hard and resistant, and an inner softer layer, which conforms to the leader upon application. The multi-layered structure of the crimp sleeve allows for secure fixation without the risk of breakage or slippage of the connection. The main application of the crimp sleeve is primarily for fishing leaders having a looped end, but can be applied to other areas where two or more sections of wire or line need to be secured to each other by crimping.

4 Claims, 3 Drawing Sheets

(56) References Cited

U.S. PATENT DOCUMENTS

| | | | | |
|---|---|---|---|---|
| 2008/0282599 A1* | 11/2008 | Kavanaugh | .......... | A01K 91/047 |
| | | | | 43/44.92 |
| 2009/0199344 A1* | 8/2009 | Grayson | .............. | A01K 91/047 |
| | | | | 7/106 |
| 2013/0014427 A1* | 1/2013 | Rothan | ................... | A01K 83/00 |
| | | | | 43/43.1 |
| 2013/0133240 A1* | 5/2013 | Beitzel | ................... | A01K 83/00 |
| | | | | 43/43.16 |
| 2014/0097554 A1* | 4/2014 | Fenton | ................ | B29C 66/8618 |
| | | | | 264/261 |
| 2014/0202060 A1* | 7/2014 | Ohashi | ................... | A01K 91/03 |
| | | | | 43/4.5 |
| 2017/0339936 A1* | 11/2017 | Simmons | ............... | A01K 91/04 |

* cited by examiner

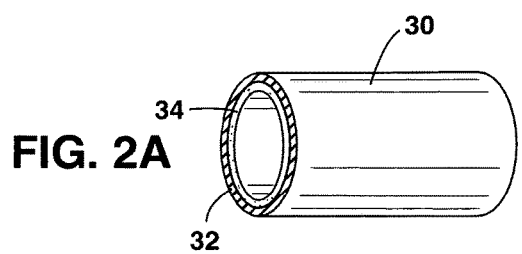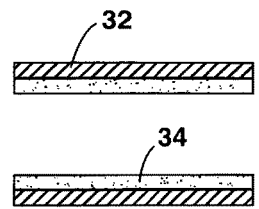
FIG. 2A  FIG. 2B
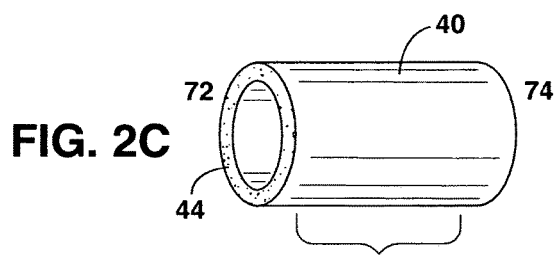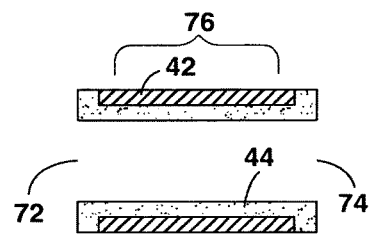
FIG. 2C  FIG. 2D
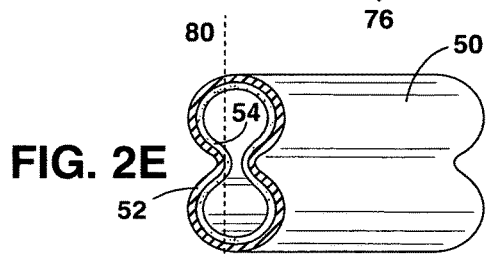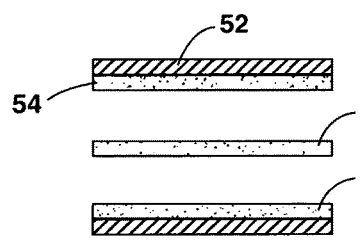
FIG. 2E  FIG. 2F
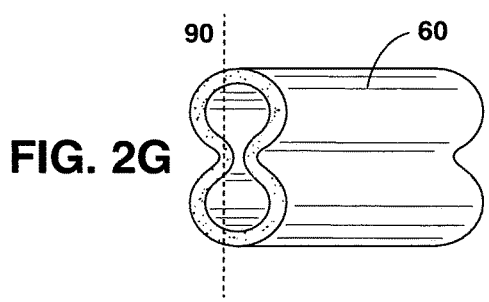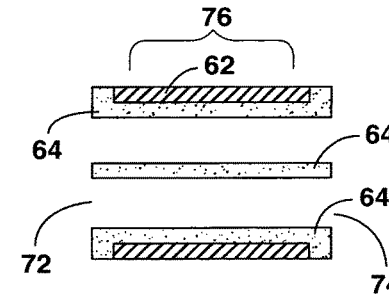
FIG. 2G  FIG. 2H

FISHING LEADER WITH MULTI-LAYERED CRIMP SLEEVE

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates, in general, to crimp sleeves as a tool to form secure attachment loops in wires and lines, and, in particular, to fishing line leaders with crimped loop endings.

2. General Background of the Invention

Sport fishing has become one of the most popular outdoors recreational activities in the United States, and the capture of trophy fish is not only the subject of countless television shows, but has even inspired works of literary art. Regrettably, large fish are more easily hooked then actually caught, and many a fisherman's dreams are shattered at the last moment because the fish breaks the line. One of the reasons for such unfortunate developments is the fact that some of the most popular fish, including Northern Pike and Musky, have exceptionally sharp teeth, easily cutting though monofilament and even braided lines made out of Kevlar.

To prevent toothy predators from biting through fishing line, the fishing industry has marketed 'leaders', short pieces of resistant line placed between the terminal tackle (e.g. lure, hook, etc.) and the fishing line. These leaders consist of bite-resistant material such as hard mono, fluorocarbon, or wire. Owing to the stiff and inflexible nature of such materials, they usually cannot be knotted, but have loops on both ends. These loops are secured by attaching a metallic crimp sleeve to the end of the leader, bending the leader tip backwards into the crimp sleeve, and compressing the crimp sleeve. Both ready-made leaders with crimped loops and individual components such as leader material, crimp sleeves, and crimping tools are offered by industry.

Unfortunately, crimped leaders are prone to failure by themselves, and whereas they fairly reliably resist bite-offs by fish, they can and do fail due to breaking of slipping of the leader at the level of the crimp connection. If the crimp sleeve is attached to tightly, the metal of the crimp compromises the integrity of the leader material, leading to breakage, especially at the edge of the crimp. If the crimp sleeve is attached not tight enough, the leader material will slip through the sleeve when pulled hard. In either of these events, the loss of a fish occurs. It is a universally accepted fact that, owing to the problem with the crimped connections at their loop ends, breakage of fishing leaders occurs at tensile challenges well below the strength rating of the leader material of which they are formed.

DESCRIPTION OF THE PRIOR ART

Given the problem of inadequately secured leader ends, the fishing literature abounds with advice on how to apply just the right amount of pressure to crimp sleeves, where to apply the pressure (e.g, center of crimp rather than edges), and even offers equally witty and useless Shakespearean reflections such as 'to crimp, or not to crimp—that is the question'. Countless online tutorials deal with just that same issue.

Giving the above described problem and unsatisfactory advice on how to solve it, there appears to be a need for a new type of crimp and crimped fishing leader which a) securely fastens leader end loops without risk of slippage of the leader material through the crimp sleeve, b) does not damage and weaken the leader material, and c) works for all types of leaders, whether hard mono, fluorocarbon, or wire material. The current invention addresses and resolves this issue.

BRIEF SUMMARY OF THE INVENTION

The present invention solves the problems confronted in the art in a simple and straightforward manner. The crimp sleeve consists of at least two layers: an outer layer made of relatively hard metal or other compressible and permanently deformable material, and an inner layer made of either a softer metal, or of another material such as hard plastic. The outer layer, when squeezed with the crimping tool, will apply onto the leader material the force needed to keep it in place. The inner layer, softer than both the outer layer of the crimp sleeve and the leader material itself, will adapt to the circumference of the leader (thereby applying uniform pressure on it) without damaging it.

There are numerous advantages to the present invention, as listed below:

1. The invention can be made of materials suited to the leader material to which they are applied. As an example, crimp sleeves designed to secure the end of steel wire leaders could feature an outer layer of steel or copper, and an inner layer of lead, tin, or another softer metal. Crimp sleeves intended to secure the ends of hard mono or fluorocarbon leaders could feature an outer layer of metal and an inner layer of soft metal, plastic, hard resin or similar material.
2. The cost of this invention is quite modest.
3. The invention would reliably prevent both slippage and breakage of the loop end, and should lead to a breakage point of the completed leader close to the rated breakage strength of the leader material.

BRIEF DESCRIPTION OF THE SEVERAL VIEWS OF THE DRAWINGS

FIG. 2A is a perspective view of the first embodiment of the novel crimp sleeve, uncompressed, using a single-barrel type sleeve type.

FIG. 2B is a longitudinal cross sectional view of the first embodiment of the novel crimp sleeve, uncompressed, using a single-barrel type sleeve type.

FIG. 2C is a perspective view of the second embodiment of the novel crimp sleeve, uncompressed, using a single-barrel type sleeve type.

FIG. 2D is a longitudinal cross sectional view of the second embodiment of the novel crimp sleeve, uncompressed, using a single barrel type sleeve type.

FIG. 2E is a perspective view of the first embodiment of the novel crimp sleeve, uncompressed, using a double-barrel type sleeve type.

FIG. 2F is a longitudinal cross sectional view of the first embodiment of the novel crimp sleeve, uncompressed, using a double-barrel type sleeve type.

FIG. 2G is a perspective view of the second embodiment of the novel crimp sleeve, uncompressed, using a double-barrel type sleeve type.

FIG. 2H is a longitudinal cross sectional view of the second embodiment of the novel crimp sleeve, uncompressed, using a double barrel type sleeve type.

Figure 1A:
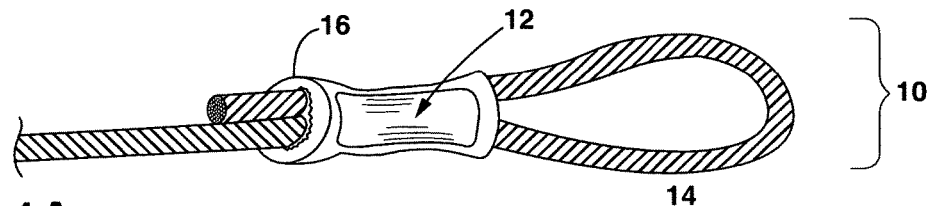
FIG. 1A is a perspective frontal view of a typical loop ending of a fishing leader, the loop being secured with a conventional compressed single-barrel metal crimp sleeve.

PARTS LIST 10 conventional looped fishing leader end
12 "bite mark" from crimping plyers
14 leader material
16 conventional crimp sleeve, single-barrel type, compressed
18 area of un-apposed crimp sleeve
20 compressed leader material
22 support wall of traditional crimp sleeve
24 area of injury to leader material
26 conventional crimp sleeve, double-barrel type, compressed
30 novel crimp sleeve, first embodiment, single-barrel type, uncompressed
32 support wall of novel crimp sleeve, first embodiment, single-barrel type
34 cushioning layer of novel crimp sleeve, first embodiment, single-barrel type
40 novel crimp sleeve, second embodiment, single-barrel type, uncompressed
42 support wall of novel crimp sleeve, second embodiment, single-barrel type
44 cushioning layer of novel crimp sleeve, second embodiment, single-barrel type
50 novel crimp sleeve, first embodiment, double-barrel type, uncompressed
52 support wall of novel crimp sleeve, first embodiment, double-barrel type
54 cushioning layer of novel crimp sleeve, first embodiment, double-barrel type
60 novel crimp sleeve, second embodiment, double-barrel type, uncompressed
62 support wall of novel crimp sleeve, second embodiment, double-barrel type
64 cushioning layer of novel crimp sleeve, second embodiment, double-barrel type
72 proximal end of novel crimp sleeve
74 distal end of novel crimp sleeve
76 mid-section of novel crimp sleeve
80 hatched reference line relating to embodiment 50 of novel crimp sleeve
90 hatched reference line relating to embodiment 60 of novel crimp sleeve
92 jagged outside deformations of novel crimp sleeve after crimping process
94 jagged inside deformation of novel crimp sleeve after crimping process

DETAILED DESCRIPTION OF THE INVENTION

FIG. 1A shows a standard fishing leader loop end 10, the loop being secured by compressed conventional crimp single-barrel sleeve 16, compressed. Shown is "bite-mark" 12, the indentation of crimp sleeve 16 caused by the crimping plyers during the compression process.

Figure 1B:
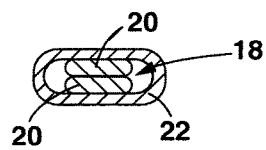
FIG. 1B is an orthogonal cross sectional view of the mid-section of a compressed conventional single-barrel crimp sleeve.

FIG. 1B shows an orthogonal cross sectional view of the crimped area. As can be seen, compressed leader material 20 has been deformed out of its originally round shape. Further, there are multiple spaces 18 of un-apposed support wall 22 of the crimp sleeve, indicating that in that space compressed leader material 20 is not secured against slippage.

Figure 1C:
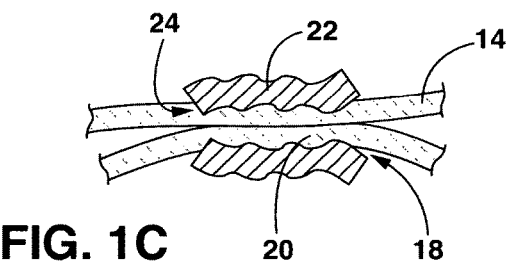
FIG. 1C is a longitudinal cross sectional view of a compressed conventional single-barrel crimp sleeve.

FIG. 1C shows once again the crimped area. Support wall 22 of the crimp sleeve is indented owing to the crimping tool, however, the pressure exerted on compressed leader 20 is uneven, leading not only to areas 18 of un-opposed support wall 22 (shown in FIG. 1B), but also areas of injury 24 to compressed leader 20. Such areas of injury 24 create focal weakness and a potential starting point for leader rupture.

Figure 1D:
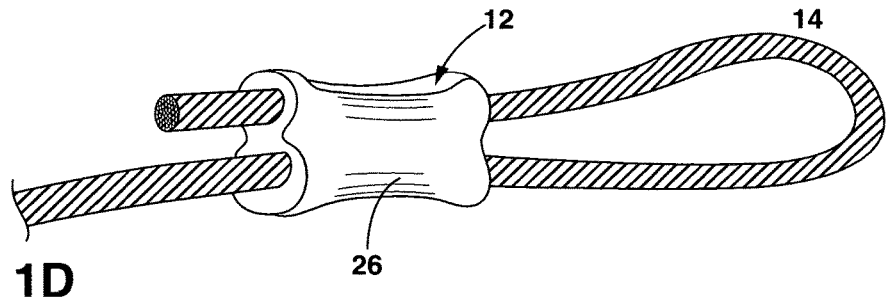
FIG. 1D is a perspective frontal view of a typical loop ending of a fishing leader, the loop being secured with a conventional compressed double-barrel metal crimp sleeve.

FIG. 1D shows a standard fishing leader loop end 10, the loop being compressed with a conventional double-barrel crimp sleeve 26. "Bite mark" 12 is again depicted.

Figure 1E:
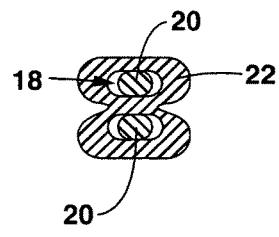
FIG. 1E is an orthogonal cross sectional view of the mid-section of a compressed conventional double-barrel crimp sleeve.

FIG. 1E shows that, similar to a single-barrel type standard crimp sleeve, the double-barrel model leads to deformation of the compressed leader material 20, and there are spaces of un-apposed support wall 22, setting the loop up for failure due to slippage.

Figure 1F:
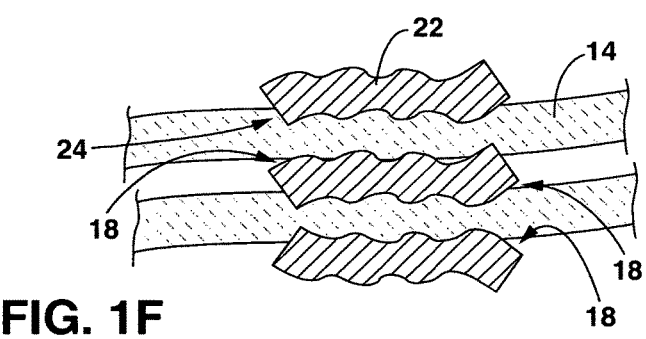
FIG. 1F is a longitudinal cross sectional view of a compressed conventional double-barrel crimp sleeve.

FIG. 1F shows a longitudinal cross sectional view of the crimped area, using a conventional double-barrel type crimp sleeve 26. Similar to a conventional single-barrel crimp sleeve, there are both areas 18 of un-apposed support wall 22 and areas of injury 24 to compressed leader material 20, potentially causing slippage or breakage, respectively.

FIG. 2A shows a perspective view of an uncompressed first embodiment 30 of a novel type crimp sleeve. The crimp sleeve has an outer layer 32 of hard, compressible material (e.g. steel, aluminum, copper), and an inner cushioning layer 34, made out of material such as comparatively soft metal (e.g. tin, lead), or plastic, or another deformable solid material.

FIG. 2B shows layers 32 and 34 of the uncompressed first embodiment 30 in a longitudinal cross sectional view.

FIG. 2C shows a perspective view of an uncompressed second embodiment 40 of the novel type crimp sleeve. This crimp sleeve embodiment 40 is divided, for purposed of illustration, into proximal end 72, distal end 74, and midsection 76. Crimp sleeve embodiment 40 features an outer layer 42 of hard, compressible material. However, this outer layer 42 does not extend along the entire length of crimp sleeve 42. Inner cushioning layer 44 does extend along the entire length of sleeve embodiment 40, broadening at the proximal 72 and distal 74 ends, thereby surrounding and enveloping outer layer 42 on three sides.

FIG. 2D shows the relationship of support layer 42 and cushioning layer 44 of uncompressed second embodiment 40, using a longitudinal cross sectional view.

FIG. 2E shows a perspective view of a first embodiment 50 of an uncompressed novel type double-barrel crimp sleeve. Similar to the novel single-barrel crimp sleeve 30, novel double-barrel crimp sleeve 50 has an outer layer 52 of hard, compressible material, and an inner cushioning layer 54. Also shown is hatched reference line 80, which refers to the subsequent illustration.

FIG. 2F shows layers 52 and 54 in a longitudinal cross sectional view in this uncompressed double-barrel model 50. Note that the cross sectional view is obtained at a point corresponding to hatched reference line 80 of FIG. 2E.

FIG. 2G shows a perspective view of a second embodiment 60 of the novel type crimp sleeve, as applied to an uncompressed double-barrel model. Again, for purposed of illustration, it is divided into proximal end 72, distal end 74, and mid-section 76. Crimp sleeve embodiment 60 has an outer layer 62 of hard, compressible and permanently deformable material, extending only along mid-section 76. Cushioning layer 64 does extend the entire length of sleeve embodiment 60, broadening at the proximal 72 and distal 74 ends, thereby surrounding and enveloping outer layer 62 on three sides. Also shown is hatched reference line 90, which refers to the subsequent illustration.

FIG. 2H shows the relationship of support layer 62 and cushioning layer 64 of second embodiment 60, uncompressed double barrel type, using a longitudinal cross sectional view. Note that the cross sectional view is obtained at a point corresponding to hatched reference line 90 of FIG. 2G.

Figure 3A:
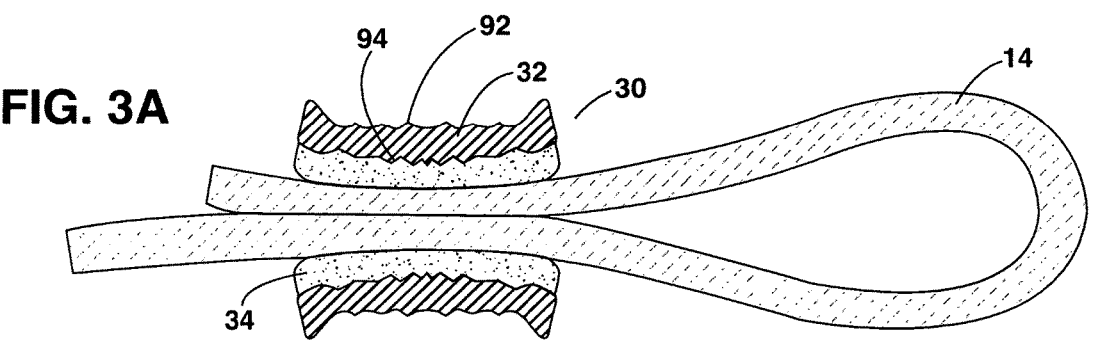
FIG. 3A is a longitudinal cross sectional view of the first embodiment of the novel crimp sleeve, compressed, using a single-barrel type sleeve, and forming a loop out of leader material.

FIG. 3A shows the first embodiment of the new crimp sleeve, compressed and as applied to a single-barrel crimp model. Support wall 32, following the crimping process, shows rugged deformations and jagged edges both on the outside 92 and on the inside 94. Such jagged edges on the inside 94 are liable to introduce areas of injury to compressed leader material 20 in conventional crimp sleeves. Owing to cushioning layer 34, however, such injury cannot be imparted on leader material 20 in this new crimp sleeve 30.

Figure 3B:
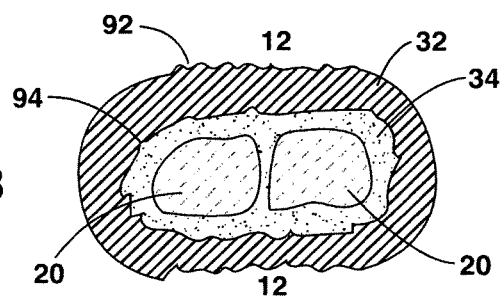
FIG. 3B is an orthogonal cross sectional view of the first embodiment of the novel crimp sleeve, compressed, using a single-barrel type sleeve.

FIG. 3B shows the special relation of support wall 32, cushioning layer 34, and compressed leader material 20 in this first embodiment of the novel crimp sleeve 30, as applied to a single barrel crimp sleeve model. Compressed leader material 20 undergoes some deformation (as evidenced by the fact that its usual round cross-sectional shape is lost), however, there are no areas of injury 24 to leader material 20, since compressed material 20 is spatially separated from the hard material of support wall 32. Further, as also seen in this orthogonal cross-sectional view, cushioning layer 34 completely surrounds both strands of compressed leader material 20, without un-apposed areas 18. It is plainly evident that this significantly reduces the chance of breakage of the leader loop due to weakening of compressed leader material 20 or slippage of the same.

Figure 3C:
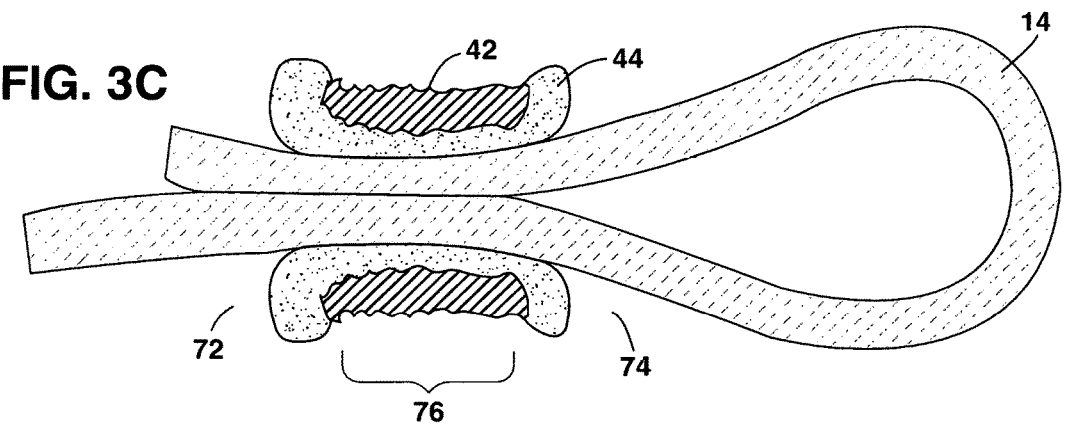
FIG. 3C is a longitudinal cross sectional view of the second embodiment of the novel crimp sleeve, compressed, using a single-barrel type sleeve, and forming a loop out of leader material.

FIG. 3C shows the second embodiment of the new crimp sleeve, as applied to a single-barrel crimp model. Support wall 42 extends only along mid-section 76. Cushioning layer 44 broadens at proximal end 72 and at distal end 74, surrounding support wall 42 on three sides. This modification, avoiding any hard crimping material at the proximal or distal edges of the crimp, further reduces the chance of injury to the compressed leader material 20 due to uneven crimping.

The foregoing embodiments are presented by way of example only; the scope of the present invention is to be limited only by the following claims.

The invention claimed is:

1. A crimp sleeve configured to secure a loop on a fishing leader, the leader being made of a fish-bite resistant material; said leader comprises a proximal end and a distal end, wherein said distal end terminates in said loop; said crimp sleeve comprises a compressible and permanently deformable outer layer made of a first material that is hard, and a compressible inner layer made of a second material that is softer than the first material, wherein the inner diameter of said outside layer is substantially equal to the outer diameter of said inner layer; said crimp sleeve further forming an inner lumen into which said loop is introduced for the purpose of fixation.

2. The crimp sleeve of claim 1, wherein said inner lumen is formed as a single barrel.

3. The crimp sleeve of claim 1, wherein said inner lumen is formed as a double barrel.

4. The crimp sleeve of claim 1, further comprising a proximal end, a distal end and a midsection, whereby said outer layer extends only along said mid-section of said crimp sleeve, and said inner layer extends from the proximal end to the distal end.

* * * * *